United States Patent [19]

Harris et al.

[11] 3,771,394

[45] Nov. 13, 1973

[54] TRIMMER FOR PLASTIC BOTTLES
[75] Inventor: Gerald L. Mohney, Toledo, Ohio
[73] Assignee: Owens-Illinois, Inc., Toledo, Ohio
[22] Filed: Sept. 10, 1971
[21] Appl. No.: 179,337

[52] U.S. Cl.................. 83/214, 83/618, 83/262, 83/269, 83/628, 83/914
[51] Int. Cl............................................. B20d 5/20
[58] Field of Search....................... 83/914, 213, 214, 83/262, 282, 269, 618, 628; 425/306, 307

[56] References Cited
UNITED STATES PATENTS

| | | | |
|---|---|---|---|
| 3,377,899 | 4/1968 | Wolford | 83/914 X |
| 3,661,492 | 5/1972 | Massa | 83/914 X |
| 3,520,021 | 7/1970 | Waechter et al. | 83/914 X |
| 2,310,120 | 2/1943 | Rober et al. | 198/210 X |

FOREIGN PATENTS OR APPLICATIONS 1,159,626 12/1963 Germany .............................. 83/914

Primary Examiner—Andrew R. Juhasz
Assistant Examiner—Leon Gilden
Attorney—Philip M. Rice et al.

[57] ABSTRACT

Method and apparatus is provided for trimming flash material from plastic containers while the containers remain on a continuously moving conveyor. A pair of grasping arms hold a single container in a stationary position on the conveyor preparatory to engagement and trimming by a deflasher mechanism. The deflasher mechanism has a pair of cam operated nest members which close around the container in the area to be trimmed and hold it in a fixed position as a knife member associated with one of the nest members trims the flash. Opening and closing of the platens is effected by means of rotary actuators mounted in cams of the respective platens. The cam of one of the platens follows while the cam of the other platen follows, in part, an arcuate path causing a lost motion during part of the movement of the rotary actuator.

5 Claims, 12 Drawing Figures

TRIMMER FOR PLASTIC BOTTLES

BACKGROUND OF THE INVENTION

In the molding of plastic bottles and jugs, the molding process frequently results in the container being formed with waste or flash material which must subsequently be trimmed in order to form a satisfactory container. Inasmuch as the trimming operation results in an added cost for manufacturing such containers, it obviously is desirable that it be effected as efficiently and with as little handling as possible. Previous methods of trimming bottles have frequently required that the container be removed from the conveyor in order to perform the trimming operation. One such apparatus is described in U.S. Pat. No. 3,377,899, which is assigned to the assignee of the present invention. Other types of trimming devices have required the utilization of extensive valve arrangements which added excessively to the cost of the unit and which were susceptible to break downs. Furthermore, prior art trimming devices have been either too expensive, too complicated for efficient trimming, or too slow to provide for efficient handling and trimming of containers.

Accordingly, it is an object of the present invention to provide an economical deflasher for plastic bottles.

It is another object of the present invention to provide a deflasher for plastic containers in which the conveyor is permitted to operate continuously and yet which does not require removal of the bottles therefrom during the deflashing operation.

It is an additional object of the present invention to provide a deflasher which operates to hold and sever the waste material from the containers by a cam operated mechanism in which the oppositely disposed moveable members are actuated from the same gear mechanism.

Finally, it is an object of the present invention to provide an on-conveyor deflasher which is operable to, first, close nest members around a container adjacent the flash material and, thereafter, to effect the severing of such flash by means of the same rotary gear and cam mechanism utilized to close such nest members.

Additonal objects and advantages of the present invention will become apparent from the following detailed description taken in conjunction with the annexed sheets of drawings, on which:

Figure 1:
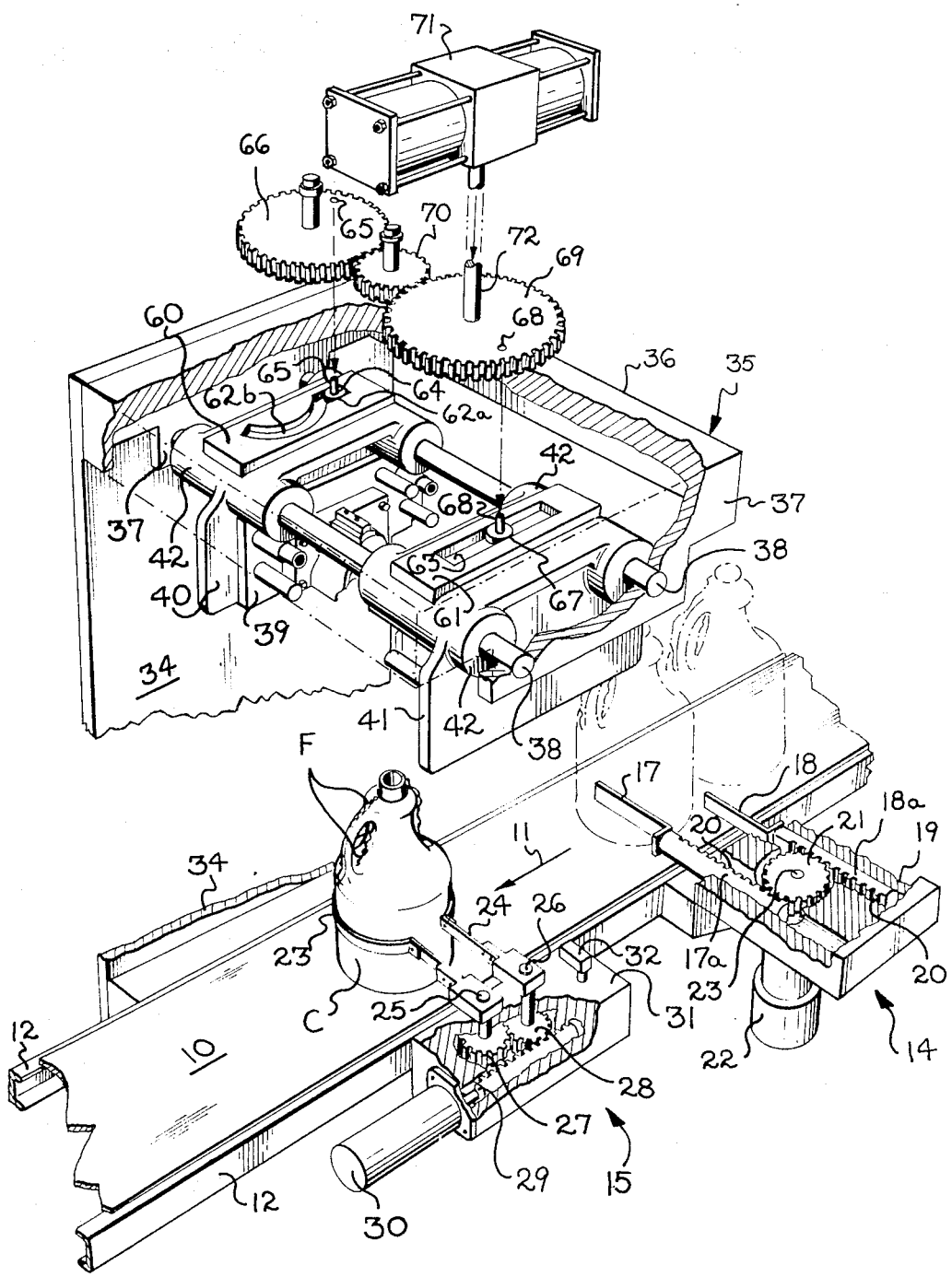
FIG. 1 is a perspective view, partly exploded, of the apparatus of the present invention including the deflashing and the container positioning mechanisms.

Referring now to the drawings, there is provided a conveyor 10 for moving a plurality of containers C having waste or flash material F to be trimmed therefrom. Preferably, the conveyor 10 moves continuously in the direction indicated by the arrow 11. Although an intermittently operated conveyor could obviously be utilized, a continuously moving one is preferred as it is less expensive to build and has fewer maintenance problems. Any conventional frame structure 12 may be provided for supporting the conveyor 10. Mounted on the frame 12 is a gate mechanism generally designated by the numeral 14 and a positioner mechanism generally designated by the numeral 15. The gate mechanism 14 includes a first finger member 17 and a second finger member 18 each of which extends, respectively, from a bar 17a and 18a which are received within a housing 19. The bars 17a and 18a have gear teeth 20 formed in one face thereof which permit the bars 17a and 18a to function as racks in cooperation with a rotary spur gear 21. The spur gear 21 is housed within the housing 19 and is caused to oscillate in opposite directions by means of a motor 22 having a shaft 23 connected thereto.

Thus, the construction of the gate mechanism 14 is such that oscillation of the gear 21 in a clockwise direction will cause the finger member 17 to extend to a position at which movement of the containers C will be stopped while at the same time causing the finger member 18 to be retracted out of the path of movement of the containers C. Rotation of the spur gear 21 in a counter clockwise direction causes the retraction of the first finger member 17 out of the path of movement of the containers C on the conveyor thus permitting the container immediately adjacent thereto to be moved by the conveyor 10 towards the positioner mechanism 15. The extension of the second finger member 18 during retraction of the first finger member 17 prevents the movement of any container except the one immediately adjacent the first finger member 17. The motor 22 is caused to reverse itself when the first finger 17 completes its full retraction. Such reversal causes spur gear 21 to oscillate in the clockwise direction again retracting the second finger member 18 and extending the first finger member 17. Any conventional conrol means may be utilized to effect reversal of the motor 22 upon completing the retraction of the first finger member 17. Such reversal and retraction of the second finger 18 permits the containers C lined up behind said second finger member 18 to move forward slightly so that the forwardmost container is now in position for release by the finger member 17.

Figure 2:
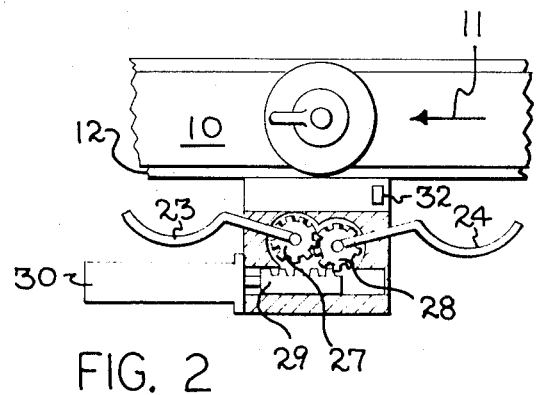
FIG. 2 is a top plan view of the container positioning mechanism in an open position.
Figure 3:
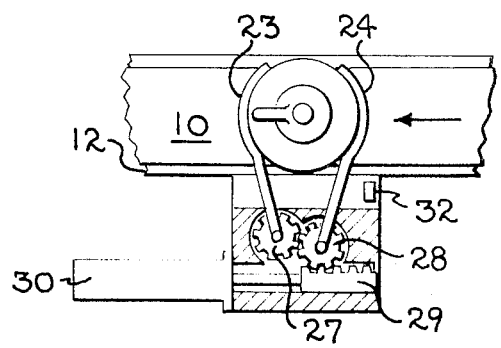
FIG. 3 is a view similar to FIG. 2 showing the container positioning mechanism in a closed position.

The positioner mechanism 15 includes a pair of arms 23 and 24 mounted for oscillation towards each other to a closed position around a container C and away from each other to an open position. The amrs 23 and 24 are connected respectively to shafts 25 and 26 extending respectively from spur gears 27 and 28 contained in a housing 31 mounted on the frame 12. As can be seen from FIGS. 1 through 3, the gears 27 and 28 have their teeth intermeshed so that the rotation of one causes rotation of the other and the gears are mounted so that gear 27 is closer to the frame than gear 28. Actuation of the spur gears 27 and 28 is effected by means of a rack member 29 mounted on the end of a rod of a fluid pressure cylinder 30. As can be seen from the drawings, the rack member 29 engages the gear 28, but does not engage the other gear 27 by virtue of its being positioned closer to the frame. Extension of the rack 29 by the fluid pressure cylinder 30 causes the gear 28 to rotate in a counter clockwise direction which in turn causes the gear 27 to rotate in a clockwise direction thereby causing the arms 23 and 24 to close around a container C.

A photocell 32 is mounted on the housing 31 and serves to actuate the fluid cylinder 30 to close the arms 23 and 24 about the container C as it moves from the gate mechanism 14 to the positioner mechanism 15. Depending on the positioning of the photocell 32 and the speed of the conveyor 10, it may be desirable to provide a timer to delay actuation of the cylinder 30 until a predetermined time after the container C passes through the beam of the photocell 32. Inasmuch as the spur gears 27 and 28 are mechanically linked together, they always hold successive containers in the same position upon reaching their fully closed position. In effect, the arms 23 and 24 capture the container during its movement on the conveyor 10 and properly position it preparatory to the deflashing operation.

Mounted above the conveyor 10 on any suitable supporting structure 34 is the deflasher mechanism 35. The deflasher mechanism 35 comprises a housing 36 extending from the support member 34. The housing 36 has a pair of downwardly extending flanges 37 at opposite ends thereof which are positioned on opposite sides of the conveyor 10 but supported above it to permit the containers C to pass thereunder. The flanges 37 support a pair of parallel guide rods 38 on which are mounted two platens, namely, a nest platen 40 and a knife platen 41. The respective platens 40 and 41 extend from bushings 42 mounted on guide rods 38 which permit the platens 40 and 41 to move toward and away from each other.

Figure 7:
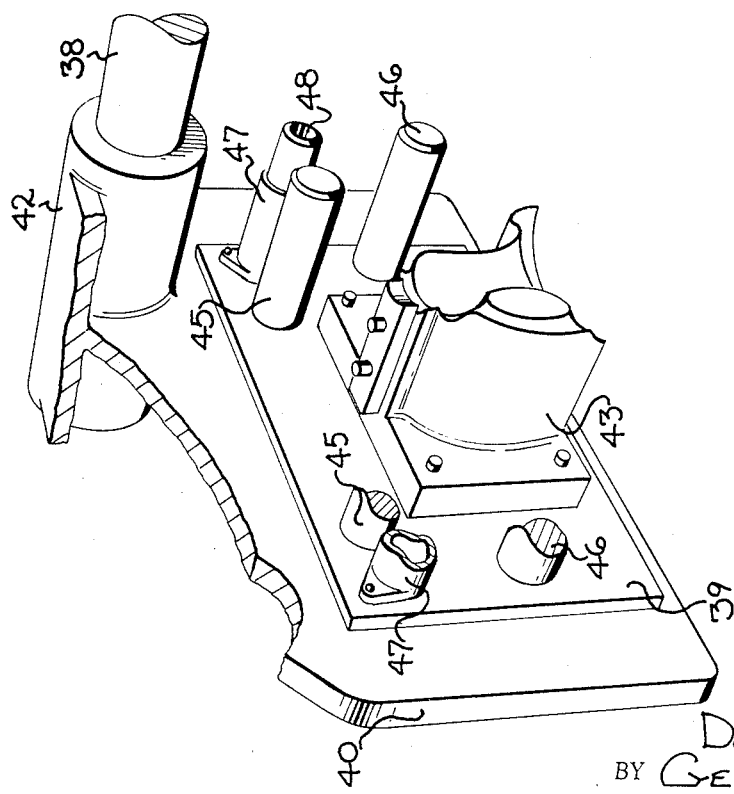
FIG. 7 is a perspective view of the fixed nest member and platen which is the left nest as viewed in FIG. 4.

Mounted on the nest platen 40 in a fixed relationship thereto is a plate 39 carrying a nest member 43 having a cavity contoured to receive and snugly retain the upper portion of a container C to be deflashed. See particularly FIG. 7. Also extending from the nest plate 39 are a pair of upper stub shafts 45, a pair of lower stub shafts 46 and a pair of hollow shafts 47 each of which has telescoped therein a hollow guide tube 48. The function of the respective upper stub shafts 45, lower stub shafts 46, and hollow shafts 47 will become apparent following a description of the knife platen 41 and its associated assembly.

Fixedly mounted on the knife platen 41 is a knife block plate 49 having a pair of hollow stub shafts 45a extending therefrom aligned with the upper stub shafts 45 of the nest plate 39. Also extending from the plate 49 are lower stub shafts 46a aligned with the lower stub shafts 46 of the nest plate 39 and outer shafts 47a which are aligned with and sized to be received in the ends of the respective hollow guide tubes 48 upon closing of the nest platen 40 and knife platen 41. Rigidly or fixedly mounted on the knife plate 49 is a knife block 50 having flash severing knives 51 extending therefrom. Yieldingly mounted on the upper stub shafts 45a and on the guide shafts 47a is a plate 52 carrying the opposite nest member 53. The opposite nest member 53 is contoured to receive the upper portion of a container so that when it and the other nest member 43 close around a container positioned therebetween, they will cooperate to hold such container in a fixed position preparatory to severing the flash or waste material therefrom.

Figure 6:
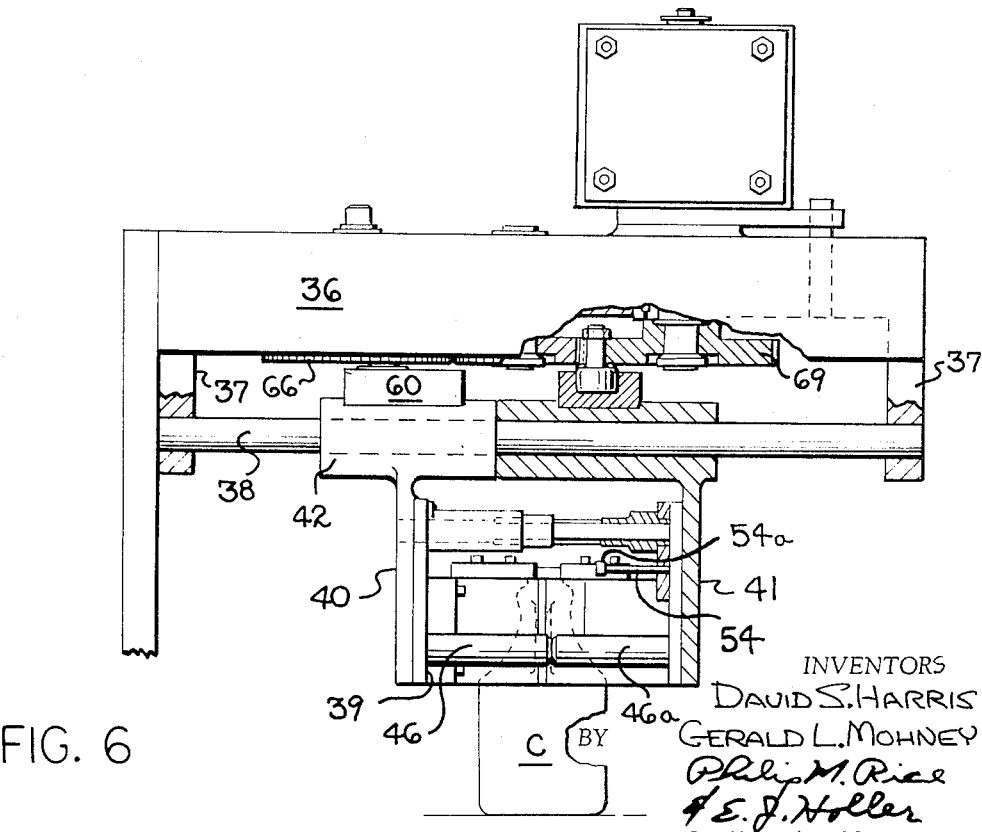
FIG. 6 is a view similar to FIG. 5 showing the deflasher mechanism during the step of severing the flash material.
Figure 8:
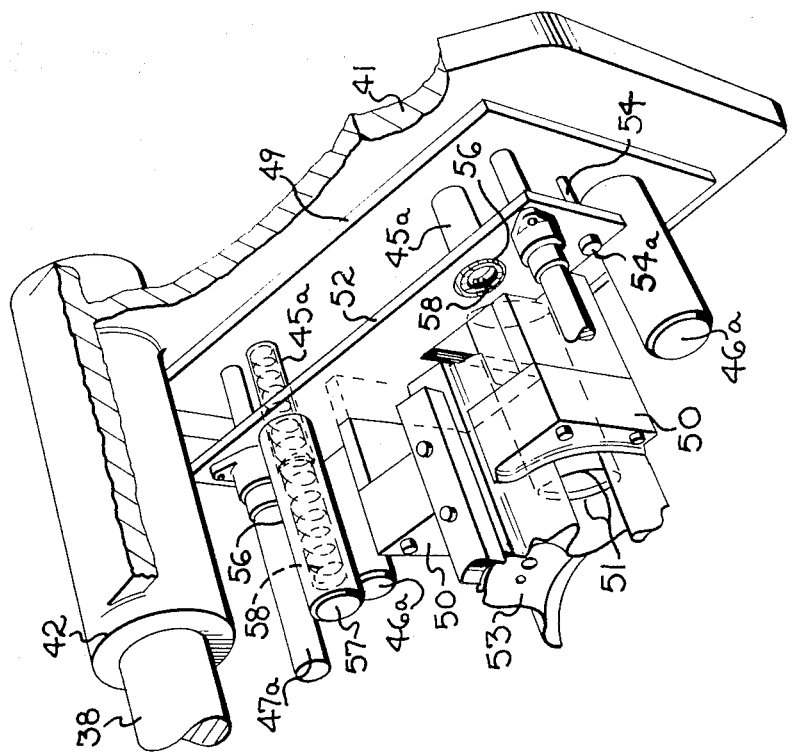
FIG. 8 is a perspective view of the yieldingly mounted nest, platen and knife members which are on the right side of the container as viewed in FIG. 4.
Figure 9:
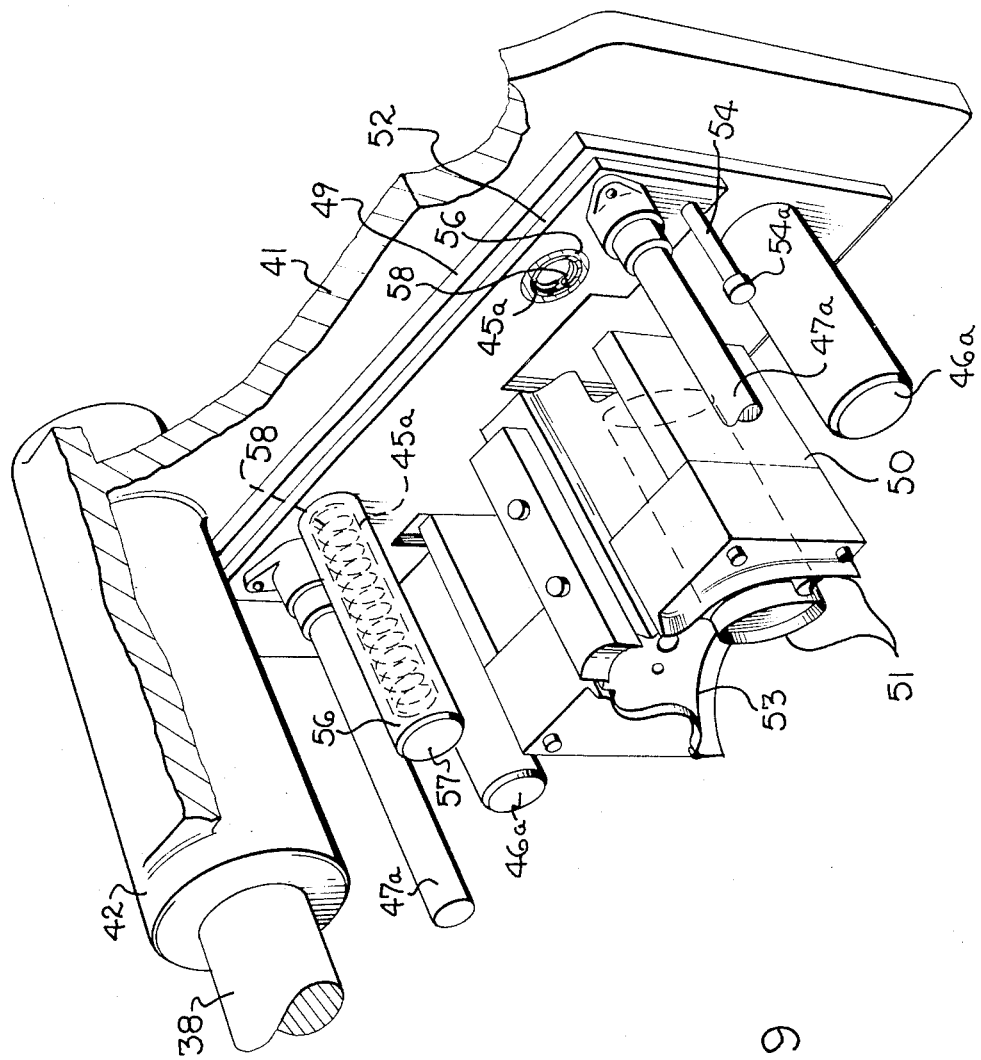
FIG. 9 is a view similar to FIG. 8 showing the next and knife members in cutting position.

Extending from the plate 52 and telescoped over the tubular stub shafts 45a are a pair of tubular housings 56 having closed ends 57. The tubular housings 56 are aligned for engagement with the upper stub shafts 45 upon closing of the nest and knife platens. Contained within each of the tubular housings 56 is a compression spring 58. The compression springs 58 are positioned between the plate 49 and the closed ends 57 and thereby function to urge the plate 52 and the opposite nest member 53 away from the knife plate 49. Such urging maintains the knives 51 in a normally retracted position and, therefore, results in the opposite nest member 53 contracting the container C and firmly gripping it before engagement of such container by the knives 51. Thus, upon closing of the nest members 43 and 53 by movement of the nest platen 40 and knife platen 41 towards each other, the respective platens will move until the respective nest members 43 and 53 have firmly gripped a container C near the center line of the line of containers C. At this point, the nest platen 40 has completed its movement and the closed ends 57 of the tubular housings 56 have engaged the ends of stub shafts 45. The knife platen 41 continues to move toward relative to the nest platen 40 against the urging of compression springs 58. Such contained movement urges the knife platen 41 and plate 49 toward the plate 52 on which the opposite nest member 53 is mounted. Inasmuch as the knife block 50 is mounted on the plate 49, the knives 51 will move forward relative to the face of the opposite nest member 53 beyond the center line of the container gripped by the respective platens 40 and 41 to thereby sever the flash from such container. This is the position of the knives 51 as illustrated in FIGS. 6 and 9.

The lower stub shafts 46 of the nest platen 40 are engaged by the lower stub shafts 46a of the knife platen 41 when the knife platen 41 reaches its fully closed position. Thus, such stub shafts 46 and 46a function as stop members. During the early portion of the closing operation, the guide shafts 47a telescope within the hollow guide tubes 48 to insure proper positioning of the respective nest members 43 and 53 upon closing. A pair of stop pins 54 (only one of which is shown) are mounted on plate 49 and extend through the resiliently mounted plate 52. The pins 54 have enlarged heads 54a which limit the movement of the plate 52 against the biasing of springs 58.

Although any conventional power means may be utilized to effect the movement of platens 40 and 41, it is preferred that such means be mechanically linked together to insure that both of the nest members 43 and 53 reach and engage the container C at substantially the same time. In order to move the respective platens 40 and 41 different distances and still have their respective movements mechanically linked together, there is provided a nest cam member 60 mounted on the nest platen 40 and a knife cam member 61 mounted on the knife platen 41.

The nest cam 60 has a cam track having a straight line portion 62a and an arcuate portion 62b. In contrast the knife cam 61 has a track 63 which follows a straight line path throughout its length. Engaged in the track 62 of the nest cam 60 is a roller 64 extending from a spindle 65 which is secured to a rotary gear 66. The spindle 65 is mounted near the periphery of the rotary gear 66 and, upon rotation of such gear 66 carries the roller 64 through an arcuate path corresponding to the path followed by the spindle 65 at its point of connection to the rotary gear 66. Similarly, the track 63 of the knife cam 61 has a roller 67 positioned therein. The roller 67 is mounted to a spindle 68 which is secured near the periphery of a rotary gear 69 positioned thereover. Thus, rotation of the rotary gear 69 causes the roller 67 to follow an arcuate path corresponding to the arcuate path followed by the spindle at the point of its juncture with the rotary gear 69. A spur gear 70 is engaged between the respective rotary gears 66 and 69 so that rotation of the gear 69 imparts rotation of the same distance and in the same direction to the gear 66. A reversible rotary motor 71 having a shaft 72 engaged with the rotary gear 69 may be utilized to power the movement of the respective rotary gears 66 and 69.

Figure 10:
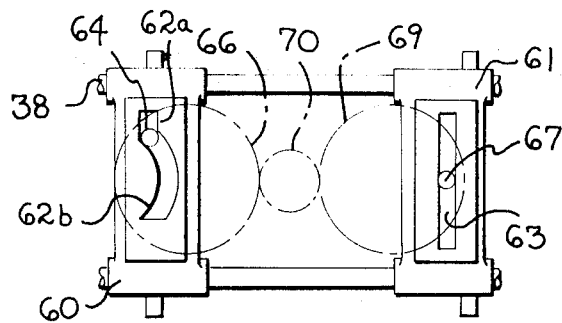
FIGS. 10–12 are top plan views, schematically illustrated, showing the relationship between the cams and the actuators during opening, gripping, and severing operations.
Figure 11:
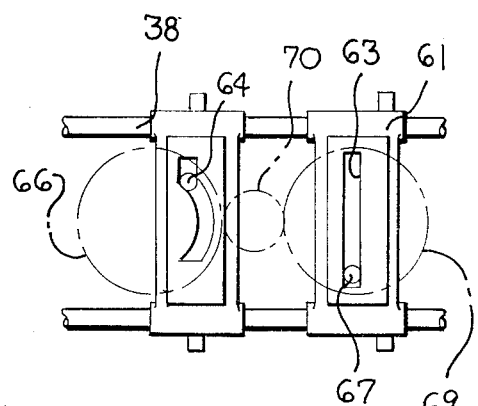
Figure 12:
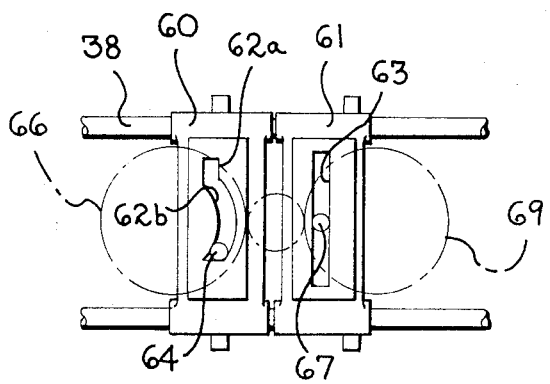

The movement and positioning of the respective members during the opening and closing operation may be seen more clearly from the schematic views illustrated in FIGS. 10 through 12. In FIG. 10 the respective platens 40 and 41 are shown in their fully open position. At such fully open position, the roller 64 associated with the nest cam 60 is nearly in the eleven o'clock position of the rotary gear 66 while the roller 67 associated with the knife cam 61 is in a three o'clock position with respect to its rotary gear 69. The respective gears 66 and 69 along with the spur gear 70 have been illustrated only in phantom lines to permit greater clarity in showing the respective positions of the cams and their followers during the closing moment.

With the members in the positions shown in FIG. 10, the reversible motor 71 is actuated upon receipt of a signal indicating that a container C is gripped by the arms 23 and 24 of the positioner mechanism. Any conventional means such as an appropriately positioned limit switch may be utilized to signal the closing of such arms 23 and 24 thus causing actuation of the reversible motor 71. Such actuation causes the motor 71 to rotate the shaft 72 and therefore the rotary gear 69 in a clockwise direction thus carrying the roller 67 from the three o'clock position illustrated in FIG. 10 to the six o'clock position shown in FIG. 11. Such rotation of the rotary gear 69 is transmitted by the spur gear 70 to a corresponding clockwise rotation of the rotary gear 66 moving the roller 64 from about the eleven o'clock position shown in FIG. 10 to nearly a two o'clock position shown in FIG. 11. Movement of the roller 67 through the arcuate path while positioned in the straight track 63 or knife cam 61 causes the knife platen 41 to which such cam 61 is secured to be moved towards a closed position. Similarly, movement of th roller 64 through its arcuate path from near the eleven o'clock to near the two o'clock position while it is associated with the straight portion 62a of its nest cam 60 causes the nest platen 40 to also move toward a closed position illustrated in FIG. 11. In the corresponding elevational views, the respective platens 40 and 41 have moved from the open position illustrated in FIG. 4 to the bottle gripping position illustrated in FIG. 5.

Figure 5:
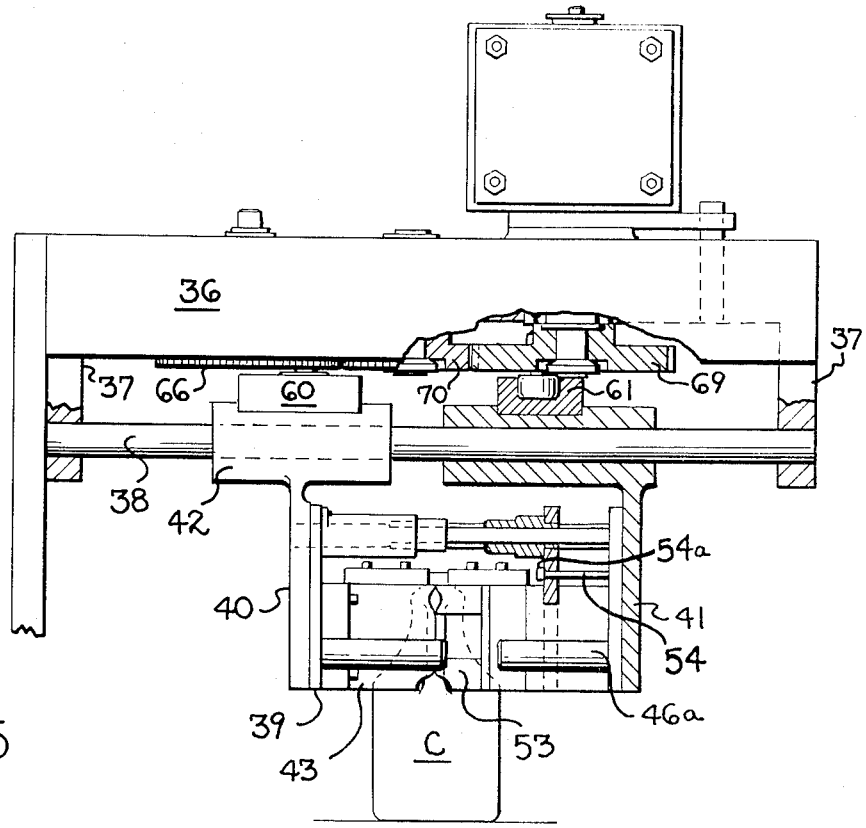
FIG. 5 is a view similar to FIG. 4 showing the deflasher mechanism in the container gripping position prior to severing of the flash material.

Inasmuch as the container has been gripped by the respective nest members 43 and 53 when the members are at the position illustrated in FIGS. 5 and 11, the nest platen 40 should then remain stationary while the knife platen 41 continues its movement toward the gripped container C thereby causing the knives 51 to move beyond the center line of such container C, severing the flash therefrom. The continued movement of the knife platen 41 while the nest platen 40 remains stationary is readily accomplished even though the movements are mechanically linked together by virtue of the respective rotary gears 66 and 69 and the spur gear 70 by virtue of the contour of the respective cam tracks. Thus, inasmuch as the track 63 of the knife cam 61 is straight throughout its length, the continued rotational movement of its roller 67 from the six o'clock position shown in FIG. 11 to the nine o'clock position shown in FIG. 12 causes the knife platen 41 to continue its closing movement toward nest platen 40 thus moving the knives to the fully closed severing position illustrated in FIGS. 6 and 9.

The roller 64 associated with the nest cam 60 has reached the end of the straight portion 62a of its track as it approaches the two o'clock position illustrated in FIG. 11. Contained rotation of the rotary gear 66 carries the roller 64 from the straight portion 62a into the curved or arcuate portion 62b of the track. The arcuate portion 62b follows a path having the same contour as that followed by the spindle 65 and roller 64. As a result of such similarly contoured arcuate track section 62b, rotation of the roller 64 therein will have no effect whatsoever on the positioning of the nest platen 40. Thus, the movement of the roller 64 from near the two o'clock position shown in FIG. 11 to near the five o'clock position shown in FIG. 12 is effected without causing any movement of the nest platen 40. Thus, as illustrated in FIGS. 5 and 6 the nest platen remains in the same position during continued movement of the knife platens 40 from the container gripping position FIG. 5 to the severing position of FIG. 6. It will be noted in FIG. 6 that the lower stub shafts 46 of nest platen 40 engage the lower stub shafts 46a of the knife platen 41 and thereby function as stop members therefore.

Figure 4:
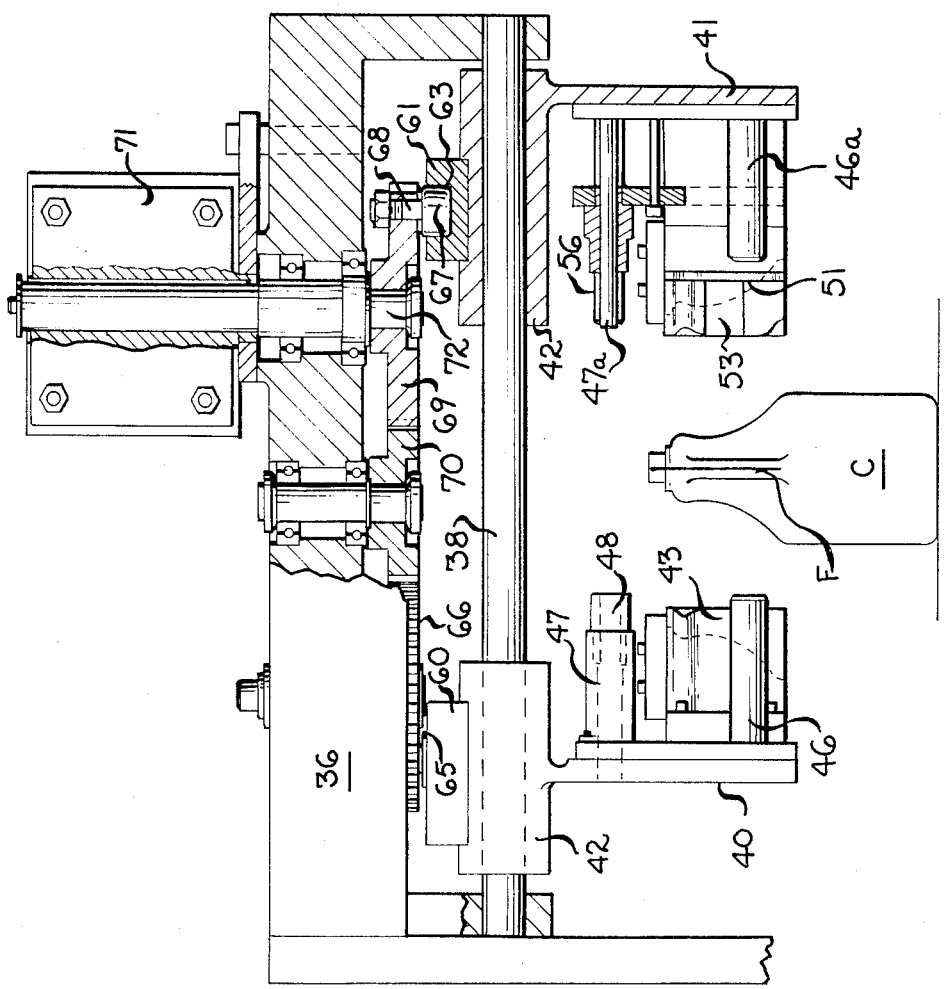
FIG. 4 is an elevational view, partly in section, showing the deflasher mechanism in an open position.

The respective rotary gears 66 and spur gears 70 are contained within housing 36 as shown in FIG. 4 through 6 but have been illustrated in an exploded view in FIG. 1 for purposes of clarity.

In opertion a group of containers C to be deflashed are moved on the continuously moving conveyor 10 until reaching the first finger member 17 of the gate mechanism 14 where there continued is prevented even though the conveyor 10 continues to move. Assuming a quantity of containers C is backed up behind the finger 17, means are actuated to cause the motor 22 to rotate the spur gear 21 in a counterclockwise direction thus retracting the first finger 17 while at the same time extending the second finger 18 thereby permitting only the single container immediately behind such first finger to move forward on the conveyor 10, the rest of the containers being held against movement by the second finger 18. The actuation gate mechanism 14 may be by any conventional signaling means indicating that containers C stacked up behind the gate mechanism 14 and the positioner mechanism 15 and deflasher mechanism 35 are in position to receive a container to be deflashed. For example, the positioned mechanism 15 may be provided with a limit switch which actuates the motor 22 upon opening of the arms 23 and 24 to release the previously deflashed container.

As the container just released by the first finger 17 moves along the conveyor 10 it passes through a beam generated by the photocell 32 which initiates actuation of the fluid cylinder 30 by a conventional control mechanism. The actuation will be delayed by conventional timing means until the container C is properly positioned for gripping by the arms 23 and 24. Such actuation of the fluid cylinder 30 causes the rack 29 to extend thereby rotating the gear 28 in a counterclockwise direction and the gear 27 in a clockwise direction to close the arms 23 and 24 around the container C thus preventing its further movement by the continuously moving conveyor 10 and holding it in position for grasping by the respective nest members 43. The motor 22 may be actuated, for example by a timer, in the reverse direction to rotate the spur gear 21 in a direction thereby again extending the first finger 17 and retracting the second finger 18.

After the arms 23 and 24 have gripped the container C the reversible motor 71 is actuated in a first direction to cause the rotary gears 66 and 69 to move in a clockwise direction from the position shown in FIGS. 1, 4 and 10 to the gripping position shown in FIGS. 5 and 11 and finally to the severing position shown in FIGS. 6, 9 and 12. Actuation of the motor 71 may be effected by conventional means such as a limit switch signaling the closing of the arms 23 and 24. Upon completion of the severing, the reversible motor 71 is immediately caused to reverse itself thus rotating the rotary gears 66 and 69 in a counterclockwise direction to open the platens 40 and 41 thus releasing the container C from the nest members 43 and 53. Such opening of the nest platens actuates suitable device such as a limit switch to cause the fluid cylinder 30 to reverse itself and retract the rack 29 thereby opening the arms 23 and 24 to release the container C which then moves forward on the conveyor 10. Such opening of the arms 23 and 24 again causes actuation of the motor 22 to release the next container and start the cycle over.

It may be seen from the foregoing description that the present invention provides a reliable and effective apparatus for removing flash material from plastic containers with the severing step being effected while the container is firmly held within nest platens. More importantly, the motions of the nest platens tied in mechanically with the movement of the knives to sever the flash permits the device to be operated with maximum reliability and minimum cost.

I claim:

1. Apparatus for deflashing plastic containers comprising first and second platens mounted for movement between open and closed positions, nest means on each of said platens for engaging and retaining a container upon movement of said platens toward their closed positions, the first nest means being rigidly connected to said first platen to engage said container as the platen reaches its fully closed position, the second nest means being yieldingly connected to said second platen to engage said container after the second platen is only partially closed, knife means mounted on said second platen to engage the flash on said container after its engagement by both of said nest means but before the second platen reaches its fully closed position, the continued movement of said second platen to its fully closed position causing the knife means to sever said flash, and means for moving said platens between open and closed positions.

2. Apparatus as defined in claim 1 wherein the means for moving the platens between open and closed positions includes
   a. first and second cams mounted in fixed relation respectively to said first and second platens,
   b. each of said cams having a track with a cam follower associated therewith, said followers being connected to drive means moving them through an arcuate path to urge the platens towards a closed position and thereafter moving them back through the same arcuate path to urge the platens towards an open position,
   c. said first cam contoured so that one portion of its track follows an arcuate path having a similar contour to the path followed by the first cam follower and another portion of its track follows a path having a dissimilar contour to the path of the first cam, the movement of the cam follower in said another portion causing movement of said first platen and movement of the cam follower in said one portion causing said first platen to remain in a fixed position.
   d. said second cam contoured with its track following a path having a dissimilar contour throughout to the path followed by the second cam follower, the movement of the second cam follower causing movement of said second platen throughout its arcuate movement.

3. Apparatus for deflashing plastic articles comprising first and second nest members mounted for movement from an open position to a closed position, means for closing said nest members to snugly engage the article adjacent the flash, one of said nest members having knife means slideably engaged therewith and moveable from a retracted non-cutting position during closing of the nest members around said article to an extended cutting position after closing of said nest members, and means for closing said nest members and extending said knife means.

4. Apparatus as defined in claim 3 further including a first platen rigidly supporting said first nest member, a second platen yieldingly supporting said second nest member and rigidly supporting said knife means, biasing means urging said second nest member to a normally extended position relative to said second platen when the platens are open and permitting movement of the second platen toward said second nest member upon closing of the nest members to urge the knife means to an extended position to sever the flash of the article held between the closed nest members.

5. Apparatus as defined in claim 4 wherein the means for closing the nest members includes a first cam mounted on said first platen, said first cam having a track following a straight line path for part of its length and an arcuate path for the rest of its length, a second cam mounted on said second platen, said second cam having a track following a straight line path throughout its length, each of said cams having a follower engaged in its respective track, each of said followers being oscillateable through an arcuate path, the oscillation of said first cam follower causing movement of the first platen only when it is engaged in the straight portion of the track, the movement of the follower in the arcuate portion of the track causing no movement of the platen, and the oscillation of said second cam causing movement of the second platen throughout its oscillatory movement.

* * * * *

PO-1050
(5/69)

UNITED STATES PATENT OFFICE
CERTIFICATE OF CORRECTION

Patent No. 3,771,394     Dated November 13, 1973

Inventor(s) Gerald L. Mohney

It is certified that error appears in the above-identified patent and that said Letters Patent are hereby corrected as shown below:

The left hand column of the cover page should be changed to read as follows:

United States Patent
Mohney

The drawings should be corrected to read with only the name Gerald L. Mohney as inventor.

Signed and sealed this 9th day of April 1974.

(SEAL)
Attest:

EDWARD M.FLETCHER,JR.          C. MARSHALL DANN
Attesting Officer              Commissioner of Patents